June 22, 1954   K. KAUTZ   2,681,854
METHOD AND APPARATUS FOR SMELTING HYDROGEN-REDUCIBLE ORES
Filed Dec. 11, 1951   3 Sheets-Sheet 1

INVENTOR.
Karl Kautz
BY
Frease, Bishop & Hamilton
ATTORNEYS

Patented June 22, 1954

2,681,854

UNITED STATES PATENT OFFICE 2,681,854

METHOD AND APPARATUS FOR SMELTING HYDROGEN-REDUCIBLE ORES

Karl Kautz, Massillon, Ohio

Application December 11, 1951, Serial No. 261,037

22 Claims. (Cl. 75—38)

The invention relates generally to a pressure melting furnace operating in conjunction with a tower for pretreating the charge on its way to the furnace, and to the method of operating the apparatus for smelting or reducing ores which are reducible by hydrogen, preferably iron ores.

The smelting or reducing of iron ores in a blast furnace results in pig iron containing impurities reduced from all the raw materials charged into the furnace, due to the treatment of ore, coke and limestone at very high temperatures. In order to minimize the percentage of impurities in the iron by forming a slag for carrying off impurities, much coke and limestone are required to form and melt the slag, thus decreasing the efficiency and increasing the cost of the operation.

Notwithstanding the high cost of the blast furnace operation, the product is nothing more refined than pig iron, which must be refined as by puddling to make a useful iron product, or in the Bessemer, open hearth, or electric furnace to make steel.

I am aware that U. S. Patent 1,603,710, issued October 19, 1926 to Charles E. Parsons et al., discloses a process of producing pure iron from its ore by treating the ore with a stream of reducing gas at temperatures of 1500° F. to 1800° F. This process requires the ore first to be thoroughly dried and passed through rolls to size evenly the particles, and the ore to be separated from its impurities in the form of gangue material either before reduction, or after reduction by a magnetic separation requiring cooling below 1400° F. The reduced separated iron is in the form of a fine powder which must then be melted in a suitable electric melting furnace without any contact with carbonaceous materials, which further adds to the cost of the process. The molten product is pure iron so that still further processing is necessary to produce steel.

It is an object of the present invention to provide a novel apparatus for continuously reducing ores containing oxygen or sulfur or both, to produce molten metal of high purity.

Another object is to provide an improved process for economically producing molten metal directly from an oxygen-bearing or sulfur-bearing ore.

A more specific object is to provide a novel method and apparatus for producing molten iron or steel, as desired, directly from iron ore.

Another object is to provide a novel pressure melting furnace adapted for partially burning at high pressures a hydrogen-rich fuel gas with insufficient oxygen to create a non-oxidizing atmosphere which is conducted from the furnace and cooled and enriched and then passed upwardly through a pretreating tower containing ore and limestone which is charged hot from the bottom of the tower directly into the furnace.

A further object is to provide a novel method of utilizing the partially burned gases from a pressure melting furnace to reduce ore and to decarbonate limestone which is then charged directly without cooling into the melting furnace to produce molten metal of high purity.

Another object is to provide a novel apparatus having a pressure melting furnace and a reducing tower communicating therewith, with means for charging reduced materials from the bottom of the tower into the furnace, and means for conducting partially burned gases from the furnace to the bottom of the tower for treating the materials therein.

A further object is to provide a novel method of cooling and enriching the partially burned gases from a pressure melting furnace in two stages by endothermic reactions and by dilution with reducing gases to produce reducing gases at proper temperatures for pretreating ores to be charged into the furnace.

A still further object is to provide a method of continuously charging a melting furnace by feeding hot reduced ore and decarbonated limestone at controlled temperatures from a reducing chamber directly into said furnace.

These and other objects are accomplished by the methods, apparatus, parts, improvements, combinations and arrangements comprising the present invention, a preferred embodiment of the apparatus being shown by way of example in the accompanying drawings, and preferred embodiments of the novel method and apparatus being described in the accompanying specification, the nature of the invention being set forth in the following statement, and the scope of the invention being defined in the appended claims.

In general terms, the invention may be stated as including a reducing tower communicating at its bottom end with a pressure melting furnace, with means for charging materials from the bottom of the tower into the furnace, there being passageways connecting the upper part of the furnace with tuyères in the lower part of the tower, whereby partially burned gases from the furnace are conducted into the tower for passing upwardly therethrough and contacting with raw materials descending through the tower, the furnace being adapted for partially burning at high temperatures a hydrogen-rich fuel gas with insufficient oxygen for complete combustion so as to create a non-oxidizing atmosphere from which the partially burned gases will be conducted to the tuyères in the tower, said gases being cooled and enriched in two stages by endothermic reactions and by dilution with reducing gases to produce a stream of reducing gases flowing upwardly through the material in the tower at temperatures from 1500° F. to 1800° F. for reducing the raw materials in the tower without adding carbonaceous material, part of the partially spent gases being mixed with air to roast the raw materials as they enter the tower.

Referring to the drawings forming part hereof, in which a preferred embodiment of the novel apparatus is shown by way of example.

Similar numerals refer to similar parts throughout the drawings.

Figures 1, 2:
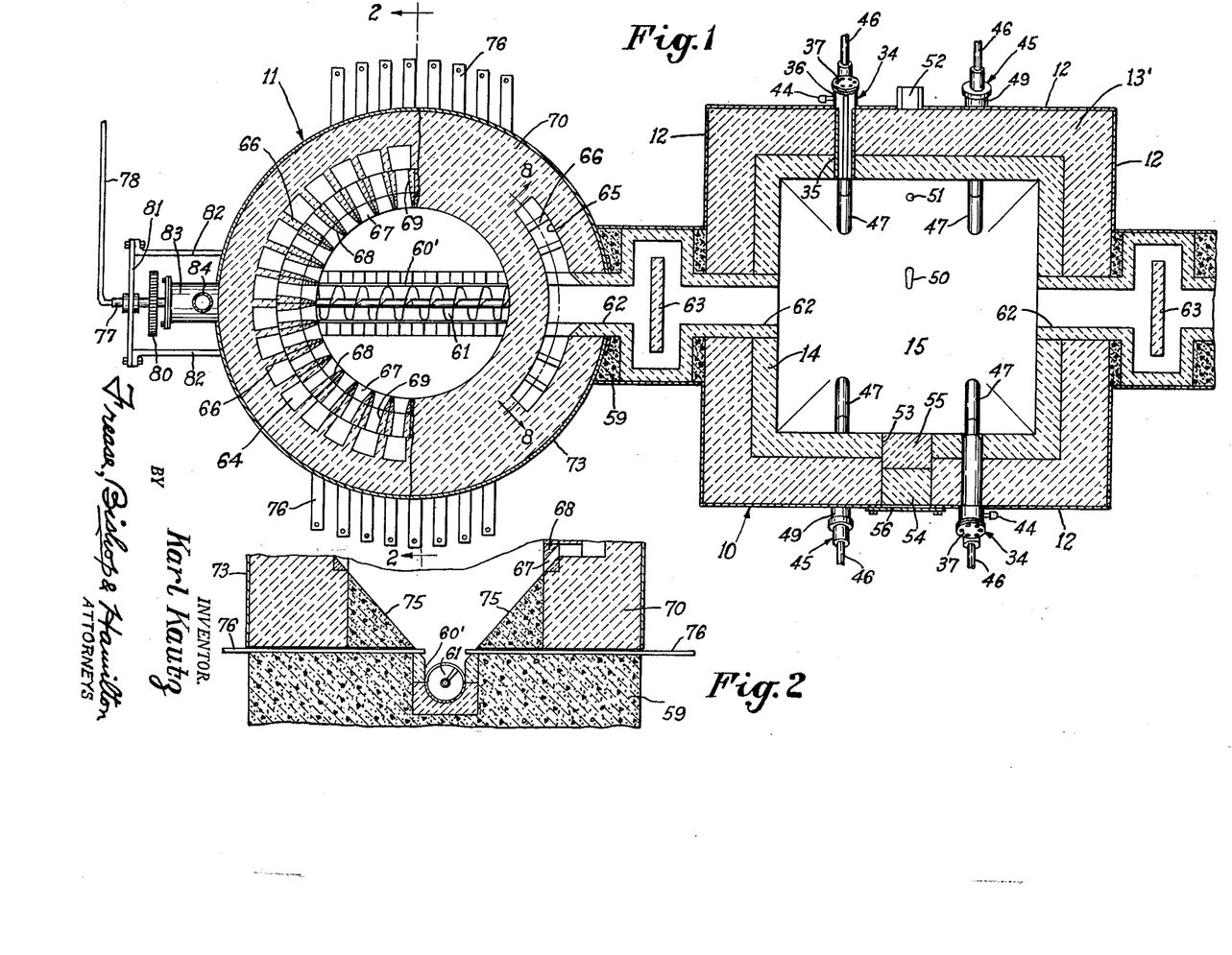
Figure 1 is a plan sectional view of the novel apparatus substantially on line 1—1, Fig. 3.
Fig. 2 is a fragmentary sectional view as on line 2—2, Fig. 1.

The apparatus shown by way of example in the drawings includes a melting furnace indicated generally at 10 which is connected to laterally adjacent vertical towers or shaft kilns one of which is indicated generally at 11. The melting furnace 10 is preferably rectangular or square as shown in Fig. 1, having the vertical tower 11 at one side thereof and another vertical tower on the opposite side which is identical to the tower 11 and is therefore not shown in the drawings in order to conserve space. The tower opposite to the tower 11 is connected to and communicates with the melting furnace in the same manner as the tower 11.

The melting furnace 10 operates under pressure and is accordingly completely encased in steel by the side plates 12 and the top plate 13. The side walls within the steel casing are preferably refractory material, and preferably consist of two courses of refractory brick indicated at 13' with an inner replaceable course of a refractory capable of withstanding high temperatures, strongly reducing atmosphere of hydrogen and carbon monoxide and molten metal and basic slag action. The inner course is indicated at 14 and may be composed of clay-carbon, clay-graphite, silicon carbide, alumina, or similar refractories and mixtures thereof.

Figures 3, 4, 5:
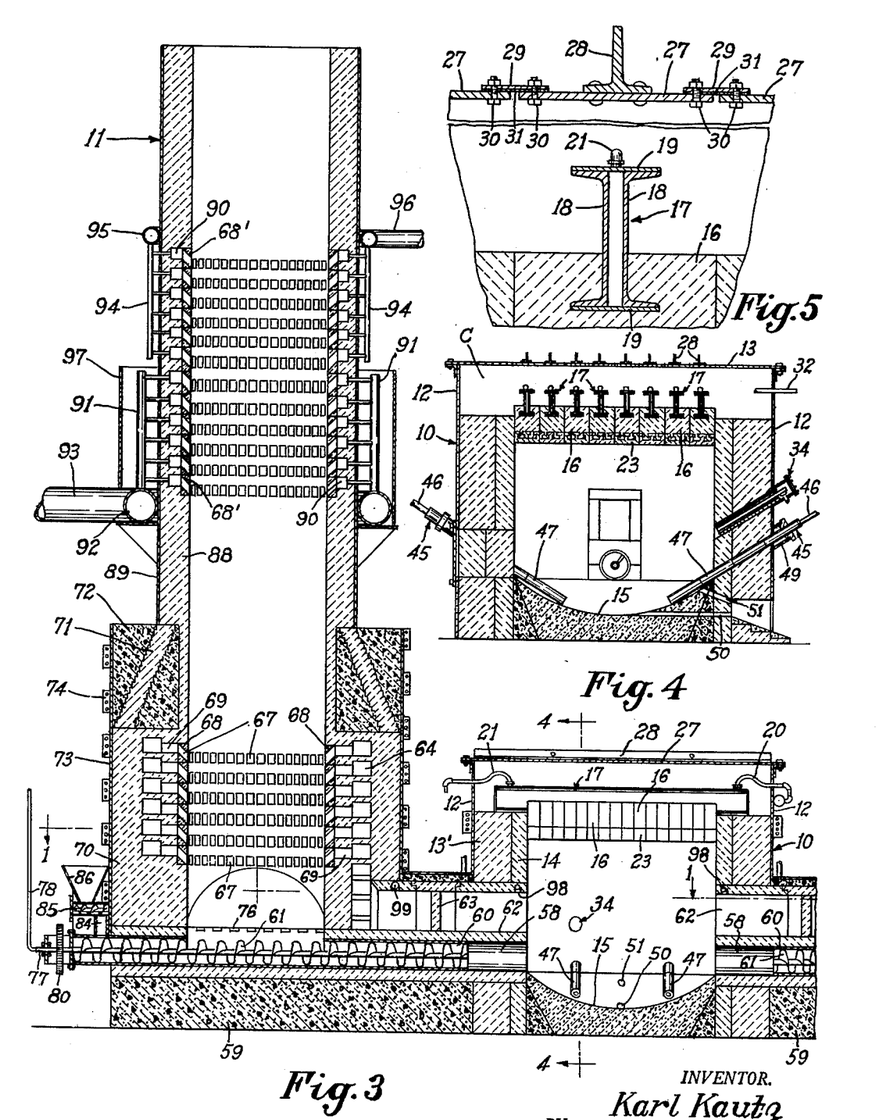
Fig. 3 is a vertical sectional view of the apparatus shown in Fig. 1.
Fig. 4 is a transverse sectional view of the melting furnace taken substantially on line 4—4, Fig. 3.
Fig. 5 is an enlarged fragmentary view of the roof portion of the furnace shown in Fig. 4.

The hearth 15 of the furnace 10 is rectangular in shape as outlined by the side walls of the furnace, and is recessed on top to form a substantially arcuate or semi-spherical basin, as indicated in Figs. 3 and 4. The hearth may be made of carbon, graphite, alumina or stabilized calcia adjusted with enough clay or slag to make the surface somewhat plastic at operating temperatures.

Figure 6:
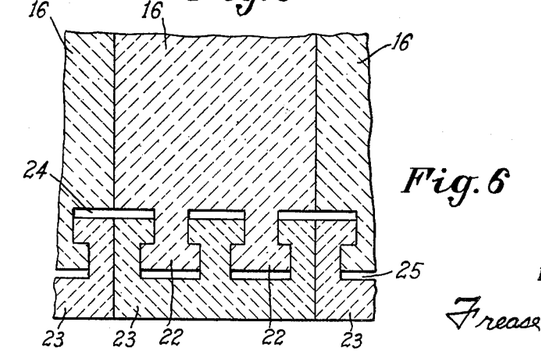
Fig. 6 is an enlarged fragmentary section of the lower part of the roof portion of the melting furnace.

The roof of the furnace consists of abutting rows of specially shaped silicon carbide blocks 16, each row being suspended from an I-beam steel member indicated generally at 17. As best shown in Fig. 5, these I-beam members 17 are hollow and preferably made of two channels 18 held in spaced back-to-back relation by upper and lower plates 19 welded to the channel flanges. The ends of the beams 17 are supported on the top of the refractory walls 13, 14 of the furnace, as shown in Fig. 3, and a cooling medium may be circulated through the hollow beams by suitable pipes indicated at 20 and 21. As best shown in Fig. 6, the roof blocks 16 have keys 22 depending from their bottom faces and a clay-graphite or clay-carbon depending from their bottom faces and a clay-graphite or clay-carbon facing 23 is slidably keyed to each block in such manner as to provide air insulating spaces 24 and 25 between the facings and the blocks. The facing inserts 23 bear the greater part of the corrosion caused by the heat and the gases within the furnace, and are made easily replaceable so that they can be removed or replaced when they become worn.

The silicon carbide blocks 16 with the clay carbon facings have high resistance to high temperatures and to hydrogen, $H_2O$ gas and carbon monoxide, as well as high mechanical strength and high thermal shock resistance. By suspending the rows of abutting blocks 16 on the cooled channels one row of blocks can be removed from the furnace while hot and replaced by a cold row of new blocks without shutting down the furnace, because of the high thermal shock resistance of the blocks.

The upper parts of the I-beams 17 are contained within a chamber formed by the side wall plates 12 and the top plate 13, and as shown in Fig. 5 the top plate preferably includes removable metal strips 27 registering with the rows of blocks 16, each metal strip 27 being reinforced by a T-bar 28 on its top surface. By removing a top strip 27, the row of roof blocks 16 immediately below and their supporting beam 17 may be lifted out for replacement without removing the entire top plate. The joints between adjacent strips 27 are made gas-tight by means of overlapping steel strips 29 attached to adjacent strips 27 by bolts 30 with gaskets 31 under the strips 29.

The upper chamber C may be kept filled with cold nitrogen, or other non-oxidizing gas introduced through a pipe indicated at 32 in Fig. 4, and the pressure of the cold gas may be adjusted to be slightly greater than the inside furnace pressure so that a slight seepage of cold gas enters the furnace between the rows of blocks 16 and mixes with the furnace gases.

Figure 9:
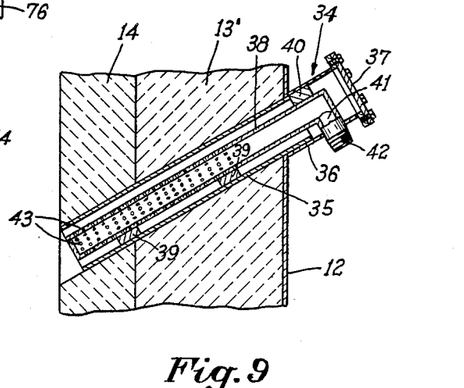
Fig. 9 is an enlarged fragmentary section longitudinally through the burner in the wall of the melting furnace.
Figure 10:
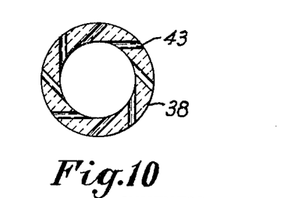
Fig. 10 is an enlarged transverse section of the inner burner tube.

The furnace 10 is fired preferably by two opposite downwardly inclined burners indicated generally at 34 staggered with respect to each other. Thus the burner flames impinge upon the material resting on the hearth and will travel in a relatively long helical path within the furnace chamber. As best shown in Fig. 9, each burner 34 includes a refractory tube 35 embedded in the side wall 13, 14 of the furnace and inclined downwardly at the proper angle. A tubular closure cap 36 with a removable closure plate 37 is welded to the outer steel casing 12 of the furnace over the end of the refractory tube 35, so that by removing the closure plate 37 the refractory tube 35 may be removed and replaced when desired.

The burner pipe 38 is centered within the tube 35 by means of spacer lugs 39 on the underside of the pipe, and a steel spacer block 40 between the upper end of the pipe and the tube 36. The upper end of the burner pipe is closed and has a side inlet 41 on which is screwed a pipe nipple 42 which extends through a hole in the outer tube 36 for connection with an oxygen supply. The burner pipe 38 is preferably made of zirconia, alumina, or silicon carbide and its lower portion provided with a plurality of small tangential perforations indicated at 43. As shown in Fig. 1, the outer tube 36 of the burner has connected at one side thereof a pipe 44 for supplying fuel gas to the refractory tube 35, so that the fuel gas flows inwardly around the oxygen pipe 38 and mixes with the oxygen as it issues from the tangential perforations 43. The oxygen issuing from the tangential perforations in the oxygen pipe produces a swirling motion to the oxygen-gas mixture causing thorough mixing, while the oxygen content of the mixture gradually increases and reaches its maximum as the mixture leaves the burner pipe.

Bubbler tubes indicated generally at 45 extend through opposite side walls of the furnace in a downwardly inclined direction and terminate at the top of the hearth surface 15. There are preferably two pairs of bubbler tubes, one pair on each of two opposite sides of the furnace. As shown one bubbler tube of each pair is located below each burner 34, the other bubbler tube being located opposite the other burner 34. These bubbler tubes preferably have an inside core 46 of silicon carbide 2" in diameter, and each core is made up of sections having a plurality of longitudinal holes therethrough, the sections being cemented together end to end with the holes in alignment. The core sections are cemented within outer casing sections 47 preferably of clay-graphite composition. The portions of the bubbler tubes extending outside of the furnace are supported in tubular casing sections 49 welded to the furnace casing 12.

The bubbler tubes 45 are used for admitting small amounts of air, oxygen or reducing gases into the melt on the hearth, and as the tubes are dissolved or corroded by the slag or melt new sections are cemented to their outer ends and the tubes lowered into the melt. The silicon carbide and graphite material of the tubes provide high thermal shock resistance, and the tubes can be withdrawn from the furnace and replaced without danger of cracking and spalling. If desired, the downwardly inclined holes for containing the bubbler tubes may be used to introduce electrodes or pyrometers into the melt.

On one side of the furnace, the hearth is provided with a metal tap hole 50 and slag hole 51 communicating with the usual pouring spouts one of which is indicated at 52 in Fig. 1. Opposite the tap holes a door opening 53 is provided through the furnace wall for making repairs to the furnace either by entering the furnace or blowing suitable patching material over the hearth. This door is normally closed by refractory blocks 54 and 55, the inner block 55 being preferably of the same composition as the furnace liner course 14. The outer end of the door opening 53 is normally sealed by means of a steel plate 56 and a suitable gasket.

At the hearth level of the furnace, charging tunnels 58 communicate with the furnace chamber at opposite sides of the hearth and extend laterally therefrom at right angles to the burners 34 and communicate with the bottoms of the towers 11. The tunnels 58 are circular in cross section and are preferably formed by refractory circle blocks which rest on the foundation 59 of the towers. The tunnels 58 are lined throughout the greater part of their lengths with tubular steel casings 60 in which are rotatably mounted helical feed screws 61 for charging materials from the bottoms of the towers into the melting furnace 10, the upper parts of the liners 60 being cut away within the towers as indicated at 60'.

Figure 8:
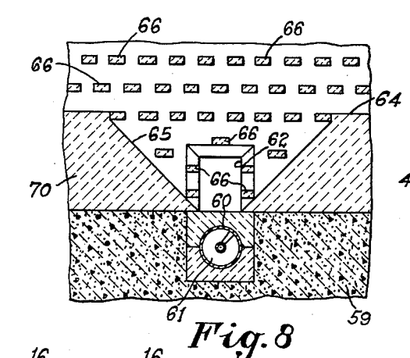
Fig. 8 is a vertical cross sectional view taken substantially on line 8—8 of Fig. 1.

Flue passageways 62 communicate with opposite sides of the furnace 10 immediately above and parallel with the charging tunnels 58, and between the melting furnace and the towers, the flue passages 62 are preferably provided with baffle walls 63 for deflecting and elongating the flow of gases therethrough, to produce better mixing of the gases. On the tower side of each baffle 63 the flue 62 opens into a cylindrical plenum chamber 64 within the walls of the lower portion of the tower 11. As shown in Figs. 1 and 8 the tunnel 62 is connected to the cylindrical plenum chamber 64 by an upwardly flared arcuate opening 65. Staggered courses of radially extending stay blocks 66 preferably extend across the opening 65 and the cylindrical plenum chamber 64.

The cylindrical plenum chamber 64 communicates with the lower portion of the tower chamber through a plurality of vertically spaced annular rows of tuyère openings 67 extending through the inner cylindric wall of the tower. The tuyère openings are preferably rectangular and enter into the tower chamber in a downwardly inclined direction at an angle of approximately 50°. Each tuyère opening may be formed in a replaceable circle block 68 of silicon carbide or kaolin and the blocks are laid in courses around the tower. The upper ends of the tuyère openings 67 communicate with horizontal ports 69 which at their outer ends open into the cylindrical plenum chamber 64.

The tower is preferably cylindrical as shown in Fig. 1 with a relatively large inner chamber of substantial height so as to handle small lumps of ore and limestone with adequate interstitial space between the lumps for the upward movement of gases. By having the tuyère openings inclined downwardly, clogging of broken pieces and dust in the tuyère openings is avoided. The tower wall 70 is preferably refractory material such as fire brick, resting on the refractory concrete foundation 59 which abuts the refractory walls 13 of the melting furnace 10. Above the plenum chamber 64 is an inwardly tapered section 71 of fire brick encased in refractory concrete 72. This tapered section and the plenum chamber walls below preferably are contained in a steel casing 73 reinforced by drawbands indicated at 74.

Figure 7:
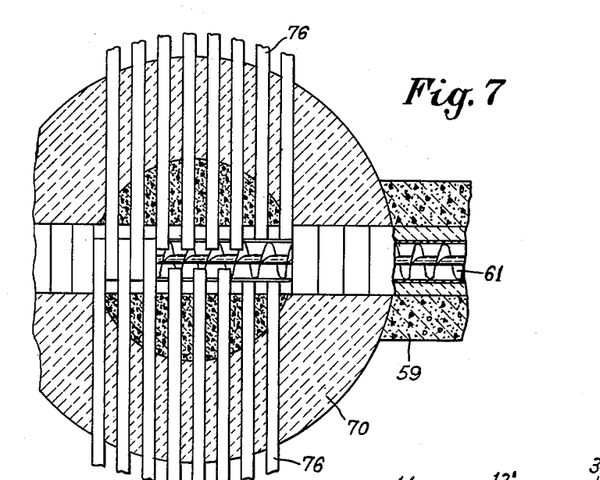
Fig. 7 is a fragmentary plan sectional view of the tower taken at the level of the supporting bars immediately above the feeding screw.

As shown in Fig. 2, the bottom portion of the tower chamber below the bottom row of tuyère openings 67 is sloped downwardly from opposite sides to the cut away portion 60' of the feed screw tunnel. These sloped portions 75 may be at an angle of about 50° and may consist of kaocast mixed with graphite. Between the sloped portions 75 and the tunnel opening 60', a plurality of staggered supporting bars 76 are driven through the furnace walls from opposite sides, their outer ends projecting beyond the furnace. The supporting bars on one side are alternately arranged with respect to the bars on the other side, and are spaced so that when the bars are forced inwardly they will interlace and form a closure over the tunnel opening 60', as best shown in Fig. 7. Thus the bars will form a closure supporting the raw materials in the tower while the feed screw is removed and replaced.

The feed screw 51 may be hollow and may have a hollow shaft 77 projecting outside of the tower with a pipe 78 connected thereto for supplying cooling gas which emerges from the inner end of the shaft into the tunnel 58. The outer end of the shaft 77 preferably has a sprocket 80 thereon which may be driven by a chain drive from any suitable power source.

Preferably the end of the shaft is journaled in a thrust bar 81 which may be supported on suitable brackets 82 embedded in the tower foundation 59. Between the sprocket 80 and the tower wall, the screw feed casing 83 communicates with a feed pipe 84 connected at its top end to a drum valve screw feed 85 fed by a hopper 86. This permits the addition of solid materials to the materials charged from the tower, and may be used for adding special metals, alloys and the like.

The cylindrical tower wall 88 projects upwardly above the tapered section 71 and is preferably enclosed in a steel casing 89. At a substantial distance above the tapered section 71, the tower wall 88 is provided with a series of vertically spaced rows of tuyère blocks 68' similar to the tuyère blocks 68, and the downwardly inclined openings in the tuyère blocks 68' communicate with a series of radial passageways 90 in the furnace walls. The lower passageways 90 are connected to vertical manifold pipes 91 which are connected to a large bustle pipe 92 encircling the furnace, and the bustle pipe 92 has a laterally extending pipe 93 for carrying off partially-spent gases from that portion of the tower. The upper passageways 90 are connected by vertical manifold pipes 94 to a bustle pipe 95 encircling the tower, and a lateral pipe 96 connects with the bustle pipe 95. Air for combustion may be supplied through the pipe 96 and the tuyères connected thereto, for a purpose to be described. As shown in Fig. 3, the manifolds 91 and the bustle pipe 92 may be enclosed in an annular tank 97 for containing cooling water.

In operating the novel apparatus according to the method of my invention, lumps or briquettes of rich iron ores are preferably coated with refractory material and charged into the top of the towers 11 with lumps of limestone. The lumps of ore may be approximately 2" in size and may be coated by dipping them in a thick slurry of refractory material. This refractory coating prevents the lumps of rich ore from coagulating or sticking together as they are heated and reduced in the tower. The slurry may be made from powdered limestone, powdered silica, plastic clay or powdered slag. The limestone lumps should be about 2" in size and the amount of limestone charged should be sufficient to properly flux the gangue carried by the iron ore. Lumps of lean ore do not need refractory coatings, because a greater amount of smaller-sized limestone lumps can be used so as to completely surround each ore lump to prevent sticking.

As an example of the amount of limestone needed to flux the gangue in a particular ore, where Lake Superior iron ore of about 51.5% Fe is charged into the towers 11, the amount of limestone required is about one-half as much as ore by volume, or about one-fourth as much by weight.

As the ore and limestone lumps descend in the tower they are first roasted and decarbonated by introducing air through the upper tuyères 68' to burn part of the partially spent gases, and then reduced by gases entering through the tuyère openings 67 at the bottom of the tower, and the hot lumps of reduced ore and burnt limestone are fed by the feed screws 61 through the charging tunnels 58 onto the hearth 15 of the melting furnace. In the melting furnace, the atmosphere is non-oxidizing to Fe, and is carefully controlled by introducing fuel gas through the burners 34 with insufficient oxygen for complete combustion, so that the fuel gases are only partially burned in the melting furnace.

The fuel gas introduced through the burners 34 is a hydrogen-rich fuel gas such as oil gas, or coal gas, or methane-rich natural gas, and the proportion of oxygen introduced through the burners is carefully regulated so that the products of combustion consist of carbon monoxide, hydrogen and hydrogen-oxide, the hydrogen content (by volume) being approximately one and one-half times the hydrogen-oxide content and the temperature of the gases within the furnace being approximately 3400° F. At this temperature in a non-oxidizing atmosphere, molten metal of high purity will be produced because the iron can be melted without oxidation and such non-reducible impurities that have not been removed in the roasting and reducing towers 11 will be carried off in the slag which is formed on top of the molten metal. By regulating the amount of carbon in the melt, either iron or steel of high purity may be produced.

Since the furnace 10 is pressure-sealed, the partially burned gases from the furnace will be forced out through the flues 62 to the towers 11. As these gases pass into the flues they are cooled by introducing additional hydrocarbon-containing fuel gas through pipes 98 extending through the furnace walls into the entrance of the flues. This additional hydrocarbon-containing fuel gas causes two endothermic reactions to take place: (1) The hydrocarbon gas thermally decomposes yielding carbon and hydrogen and absorbing heat, and (2) the finely divided extremely hot nascent carbon reacts with part of the hydrogen-oxide in the combustion gases to form carbon monoxide and hydrogen. This last reaction is known as the water gas reaction and also absorbs heat.

Thus by the addition of fuel gas, the combustion gases are rapidly cooled by dilution and by endothermic reactions, the detrimental $H_2O$ content is lowered and is replaced by an equivalent amount of CO, and a gain in hydrogen content is accomplished by thermal decomposition and by the water gas reaction. The amount of fuel gas added at this point, however, must be controlled so that the combustion gases are cooled only to temperatures of 2400°–2500° F., because the water gas reaction becomes incomplete and sluggish below these temperatures, and while thermal cracking of some hydrocarbons is still effective at 2100° F. and lower, carbon black would result because of the slowing up of the water gas reaction. Thus, if it were attempted to cool much below 2400° F. by the addition of fuel gas; carbon black, carbon dioxide and undecomposed hydrocarbon gases would be present in the gases entering the towers from the flues 62. This would result in the formation of iron carbide which would destroy the purity of the iron product.

Accordingly, cooling of the combustion gases from about 2400° F. to 1800° F., or the operating temperature between 1500° F. and 1800° F. which is maintained in the towers, is done by dilution. Cold diluting gas is introduced into the flues 62 by pipes 99 located near the passages 65 which connect the flues with the plenum chamber 64. The cold diluting gas may be hydrogen, carbon monoxide, nitrogen, or any mixture thereof, including water gas, producer gas, etc. For example, one cubic foot of cold gas at 60° F. added to three cubic feet of the enriched combustion gases at 2400° F. under standard conditions, will reduce the temperature to about 1800° F. If cold hydrogen or water gas is added greatly increased reduction will occur in the tower, if cold producer gas or the like is added slightly increased reduction occurs, while with cold nitrogen no additional reduction occurs. If hot hydrogen, at say 1200° F. is forced from a hydrogen-generating furnace into the flue in quantities sufficient to cool the 2400° F. gases to about 1800° F., an enormous increase in reduction occurs amounting to about 99% increase over that obtained with cold hydrogen.

As the cooled and enriched gases entering the towers through the tuyères 67 pass upwardly through the descending roasted ore and burnt limestone lumps at 1500° F. to 1800° F., the roasted ore is reduced and hot sponge iron lumps and burnt limestone lumps are deposited on the feed screw 61 and immediately fed into the melting furnace. At a temperature of 1800° F. iron is 61% melted so that only 39% as much heat in B. t. u.'s is required to melt a ton of iron as would be required starting at a temperature of 60° F. Thus the capacity of the melting furnace is greatly increased. By way of example, if the melting furnace is 8 feet square and operated as a high temperature melting furnace under reducing conditions it would melt approximately 32 tons of cold steel scrap per day, but with reduced iron at 1800° F. the same furnace can melt 80 tons. This is far in excess of the amount of iron that can be reduced by my process in two towers of substantial height having inner chambers 6 feet in diameter, even when 1200° hydrogen is used for diluting and cooling rather than cold gas.

By controlling the temperature of the reducing gaseous mixture entering through tuyères 67 into the tower, iron oxides are reduced to iron preponderantly by hydrogen. If sponge iron were reduced at temperatures below 1500° F. it would become pyrophoric and would ignite and burn easily in air when heated. In the present apparatus, the hot sponge iron is never allowed to cool below 1500° nor come in contact with atmospheric oxygen. By reducing the iron ores preponderantly with hydrogen in the towers 11 at 1500°–1800° F. all the iron oxides are reduced but none of the impurities are, because at those temperatures neither hydrogen nor carbon monoxide will reduce the oxides of silicon, phosphorous or manganese, so that the sponge iron contains a negligible amount of those elements. With carbon reduction at high temperatures as in the blast furnace, all three of these compounds are reduced and the elements appear as impurities in the iron product.

Sulfur, which is usually present in the charge in the form of sulfides, is lowered by hydrogen at 1500° by the formation of hydrogen-sulfide, and in the presence of a large excess of hydrogen in the towers, any sulfide which escapes oxidation in the roasting zone in the upper part of the tower is acted upon by excess hot hydrogen in the reducing zone in the lower part of the tower to further lower the sulfur content. If the proper ratio of carbon monoxide to hydrogen to $H_2O$ gas is maintained in the towers, hot sponge iron of very high purity will be obtained with very little carbon present.

Another reason for maintaining the temperature in the tower above 1500° is that below about 1400° F. the iron tends to break down the carbon monoxide and form carbon dioxide and iron carbide. If carburized sponge iron is produced in the tower, the amount of carbon in the melt may be lowered by feeding in lumps of unreduced iron ore through the hopper 86 and drum valve 85 into the feed screw, or the sponge iron from the tower can be fed faster so that some unreduced ore in the form of FeO is carried into the furnace. Further, excess carbon in the melt can be oxidized by bubbling in air or oxygen through the bubbler tubes 47.

If it is desired to produce steel in the melting furnace, it may be necessary to add the required amount of carbon, and this may be done in two ways. One way is to cool the furnace combustion gases below the 2400° F. limit by introducing more hydrocarbon-containing fuel gas at the pipes 93, which will produce some carbon black and undecomposed hydrocarbons in the gaseous mixture entering the tower. This carbon black will produce some carbon content in the melt. Another way of increasing the carbon content of the melt would be by introducing carburizing material to the outer end of the feed screw, as for example, briquettes of carbon-iron ore or crushed cast iron or pig iron.

Sponge iron tends to become sticky or pasty starting at about 1500° F. and becomes stickier as the temperature is increased. To prevent lumps of reduced rich iron ore from coagulating and sticking together, the lumps or briquettes of rich ore are preferably coated in refractory slurry before charging to towers as previously described. This coating will becomes fired and quite porous when heated in the tower. Lean ores are not so coated because greater amounts of limestone can be used.

Depending upon the kind of ore being treated in the towers the ratio of $CO$ to $H_2$ to $H_2O$ in the reducing gases may be regulated to effect reduction of the ore to iron at the operating temperature. Thus, when pure hydrogen is used, reduction of FeO to Fe ceases at 1850° F. when 40% of the hydrogen is converted to $H_2O$, but $Fe_3O_4$ is reduced to FeO up to 85% $H_2O$.

According to chemical equations, it requires 50% more hydrogen to reduce $Fe_2O_3$ to iron than to reduce FeO to iron, and I have calculated that without continuously removing $H_2O$ and recirculating about 33,333 cu. ft. of $H_2$ is required to reduce 2000 pounds of Fe from $Fe_2O_3$ at 1850° F.

In spite of these relatively large quantities of gas required, it is economical to reduce $Fe_2O_3$ ore to Fe with $H_2$ according to my invention, because part of the combustible partially-spent gases are used for roasting and preheating the ore and limestone, and the remaining partially-spent gases can be used for fuel in a hydrogen-generating furnace, or a boiler.

As the gases pass upwardly through the descending charge in the towers, the partially-spent gases at the lower rows of the upper tuyères 68' may be at temperatures of 1500°–1800° F. and are quite combustible because they still contain a small part of the hydrogen and a large part of the carbon monoxide entering the towers. They may be taken off through the bustle pipe 92 and conducted to a hydrogen generating furnace or boiler, or they may be cooled, the $H_2O$ condensed, and then recirculated into the flues 62. The upper tuyères 68', which are connected to the manifold 95 are preferably used to introduce compressed air through all of the upper tuyère openings in sufficient amount to burn about one-third of the partially-spent gases and create an oxidizing zone to heat the lumps, or briquettes, to about 1800° F. or slightly higher.

This hot oxidizing atmosphere created at the upper tuyères at the top portion of the tower is very important in pretreating the materials charged into the tower before they are acted upon by the highly reducing gases entering the bottom of the tower. The hot oxidizing atmosphere decarbonates the limestone lumps, oxidizes carbonaceous material present, roasts or oxidizes the sulfides, drives off the water of crystallization, dries and ceramically fires the refractory coating on the briquettes or, lumps of rich ore and heats the ore and limestone lumps to operating temperatures.

In treating finely divided ores such as magnetite concentrate, according to my invention, the concentrate may be first charged with 10% to 15% of plastic red-burning clay into a ceramic brick auger machine with enough water to form a stiff mud, which may then be extruded from a drain tile die in the form of a tube and cut into short lengths. These lengths, with or without a refractory coating, are then charged into the tower with the limestone lumps and the process carried on as previously described.

In treating and reducing low grade ore such as taconite ore containing about 25% iron, lumps of this low grade ore may be charged into the towers without limestone. At the bottom of the towers, the reduced lumps of ore would be removed and cooled below reoxidizing temperature, the cooled ore crushed and pulverized and the reduced iron removed by magnetic separation. The separated iron powder could then be mixed with oil or tar to a stiff mud and then charged with a small amount of limestone into the melting furnace.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention, the construction, the operation and use of preferred embodiments thereof, and the advantageous new and useful results obtained thereby; the new and useful methods and constructions, and reasonable mechanical equivalents thereof obvious to those skilled in the art, are set forth in the appended claims.

I claim:

1. The method of smelting hydrogen-reducible ores to produce molten metal of high purity, which includes the steps of partially burning hydrogen-rich fuel gas under pressure with insufficient oxygen for complete combustion in a melting furnace to create a non-oxidizing atmosphere at melting temperature in said furnace, cooling and enriching the partially burned gases from said furnace in two stages first by endothermic reactions to about 2400° F. and second by dilution with reducing gases to produce a reducing gas mixture without free carbon at a temperature of 1500° F. to 1800° F., passing said gas mixture through a column of lumps of said ore to reduce the same, and passing said reduced ore directly into said melting furnace while maintaining said reduced ore at a temperature of 1500° F. to 1800° F.

2. The method of smelting iron ores to produce molten metal of high purity, which includes the steps of partially burning hydrogen-rich fuel gas under pressure with insufficient oxygen for complete combustion in a melting furnace to create an atmosphere non-oxidizing to iron at melting temperature in said furnace, cooling and enriching the partially burned gases from said furnace in two stages first by endothermic reactions to about 2400° F. and second by dilution with reducing gases to produce a reducing gas mixture without free carbon at a temperature of 1500° F. to 1800° F., passing said gas mixture through a mixture of said iron ore with limestone to reduce and decarbonate the same, and passing said reduced iron ore and decarbonated limestone directly into said melting furnace while maintaining said reduced ore and decarbonated limestone at a temperature of 1500° F. to 1800° F.

3. The method of smelting hydrogen-reducible ores to produce molten metal of high purity, which includes the steps of partially burning hydrogen-rich fuel gas under pressure with insufficient oxygen for complete combustion in a melting furnace to create a non-oxidizing atmosphere at melting temperatures in said furnace, cooling the partially burned gases from said furnace to about 2400° F. by adding hydrocarbon-containing fuel gas to cause endothermic reactions resulting in carbon monoxide and hydrogen, then further cooling the gases to 1500° F. to 1800° F. by adding relatively cool reducing gas, passing the cooled gases through a mixture of said ore with limestone to reduce and decarbonate the same, and passing said reduced ore and decarbonated limestone directly into said melting furnace.

4. The method of smelting hydrogen-reducible ores to produce molten metal of high purity, which includes the steps of partially burning hydrogen-rich fuel gas under pressure with insufficient oxygen for complete combustion in a melting furnace to create a non-oxidizing atmosphere at melting temperature in said furnace, cooling the partially burned gases from said furnace to about 2400° F. by adding hydrocarbon-containing fuel gas to cause endothermic reactions resulting in carbon monoxide and hydrogen, then further cooling the gases to 1500° F. to 1800° F. by adding relatively cool nitrogen, passing the cooled gases through a mixture of said ore with limestone to reduce and decarbonate the same, and passing said reduced ore and decarbonated limestone directly into said melting furnace.

5. The method of smelting hydrogen-reducible ores to produce molten metal of high purity, which includes the steps of partially burning hydrogen-rich fuel gas under pressure with insufficient oxygen for complete combustion in a melting furnace to create a non-oxidizing atmosphere at melting temperature in said furnace, cooling and enriching the partially burned gases from said furnace to about 2400° F. by adding hydrocarbon-containing fuel gas to cause endothermic reactions resulting in carbon monoxide and hydrogen, then further cooling the gases to 1500° F. to 1800° F. by adding relatively cool reducing gas mixed with nitrogen, passing the cooled gases through said ore to reduce the same, and passing said reduced ore directly into said melting furnace.

6. In a method of smelting hydrogen-reducible ores to produce molten metal of high purity, the steps of cooling partially-burned hydrogen-rich gases from a melting furnace containing the reduced ores to about 2400° F. by adding hydrocarbon-containing gas to cause endothermic reactions resulting in carbon monoxide and hydrogen, and then further cooling the gases to a temperature of 1500° F. to 1800° F. by adding relatively cool reducing gas.

7. In a method of smelting hydrogen-reducible ores to produce molten metal of high purity, the steps of cooling partially-burned hydrogen-rich gases from a melting furnace containing the reduced ores to about 2400° F. by adding hydrocarbon-containing gas to cause endothermic reactions resulting in carbon monoxide and hydrogen, and then further cooling the gases to a temperature of 1500° F. to 1800° F. by adding relatively cool nitrogen.

8. The method of smelting hydrogen-reducible ores to produce molten metal of high purity, which includes the steps of partially burning hydrogen-rich fuel gas under pressure with insufficient oxygen for complete combustion in a melting furnace to create a non-oxidizing atmosphere at melting temperature in said furnace, cooling and enriching the partially burned gases from said furnace to about 2400° F. by adding hydrocarbon-containing fuel gas to cause endothermic reactions resulting in carbon monoxide and hydrogen, and adding a relatively cool reducing gas to produce a reducing gas mixture without free carbon at a temperature of 1500° F. to 1800° F., passing said gas mixture upwardly through a column of refractory coated lumps of said ore to reduce the same, creating an oxidizing zone at a temperature of about 1800° F. in the upper portion of said column of lumps, and passing the hot reduced ore with refractory coatings from the lower portion of said column directly into the melting furnace.

9. Apparatus for smelting hydrogen-reducible ores to produce molten metal of high purity, including a pressure melting furnace, walls forming a vertical roasting and reducing tower communicating at its bottom end with said furnace, means for feeding hot material from the bottom end of said tower directly into said furnace, a flue for conducting combustion gases from said furnace to said tower, a plurality of tuyères in the lower part of said tower walls and connected with said flue for discharging the combustion gases into said tower, means for discharging cooling and enriching gases into said flue, and a plurality of tuyères in the upper part of said tower walls for taking off partially-spent gases.

10. Apparatus for smelting hydrogen-reducible ores to produce molten metal of high purity, including a pressure melting furnace, walls forming a vertical roasting and reducing tower communicating at its bottom end with said furnace, means for feeding hot material from the bottom end of said tower directly into said furnace, a flue for conducting combustion gases from said furnace to said tower, a plurality of tuyères in the lower part of said tower walls and connected with said flue for discharging the combustion gases into said tower, means for discharging cooling and enriching gases into said flue, a plurality of tuyères in the upper part of said tower walls for taking off partially-spent gases, and a plurality of tuyères in said tower walls above the partially-spent gas tuyères for introducing air for burning part of the partially-spent gases to create a roasting zone.

11. Apparatus for smelting hydrogen-reducible ores to produce molten metal of high purity, including a pressure melting furnace, walls forming a vertical roasting and reducing tower communicating at its bottom end with said furnace, a feed screw for feeding hot material from the bottom end of said tower directly into said furnace, a flue for conducting combustion gases from said furnace to said tower, a plurality of tuyères in the lower part of said tower walls and connected with said flue for discharging the combustion gases into said tower, means for discharging cooling and enriching gases into said flue, and a plurality of tuyères in the upper part of said tower walls for taking off partially-spent gases.

12. Apparatus for smelting hydrogen-reducible ores to produce molten metal of high purity, including a pressure melting furnace, walls forming a vertical roasting and reducing tower communicating at its bottom end with said furnace, a feed screw for feeding hot material from the bottom end of said tower directly into said furnace, a flue for conducting combustion gases from said furnace to said tower, a plurality of tuyères in the lower part of said tower walls and connected with said flue for discharging the combustion gases into said tower, means for discharging cooling and enriching gases into said flue, a plurality of tuyères in the upper part of said tower walls for taking off partially-spent gases, and a plurality of tuyères in said tower walls above the partially-spent gas tuyères for introducing air for burning part of the partially-spent gases to create a roasting zone.

13. Apparatus for smelting hydrogen-reducible ores to produce molten metal of high purity, including a pressure melting furnace, walls forming a roasting and reducing chamber, means for feeding hot reduced material from said chamber directly to said furnace, a flue for conducting combustion gases from said furnace into the discharging end of said chamber, means for introducing cooling and enriching gases into said flue, said cooled and enriched combustion gases acting to reduce ore in said chamber, and means for introducing air at the charging end of said chamber to burn part of the combustion gases and roast the ore being charged therein.

14. Apparatus for smelting hydrogen-reducible ores to produce molten metal of high purity, including a pressure melting furnace, walls forming a roasting and reducing chamber, means for feeding hot reduced material from said chamber directly to said furnace, a flue for conducting combustion gases from said furnace into the discharging end of said chamber, means for introducing cooling and enriching gases into said flue, said cooled and enriched combustion gases acting to reduce ore in said chamber, and means at the charging end of said chamber causing burning of part of the combustion gases to create an oxidizing zone.

15. Apparatus for smelting hydrogen-reducible ores to produce molten metal of high purity, including walls forming a vertical roasting and reducing tower, a plurality of tuyères in the lower part of said tower walls for introducing gases into said tower, a pressure melting furnace, means for feeding hot reduced material from the bottom end of the tower directly into said furnace, a flue for conducting combustion gases from said furnace to the tuyeres in said tower, said furnace having a roof comprising laterally abutting rows of refractory blocks removably suspended on hollow water-cooled beams supported at their ends on the furnace walls, and said beams being located in a sealed chamber containing gas under pressure.

16. Apparatus for smelting hydrogen-reducible ores to produce molten metal of high purity, including walls forming a vertical roasting and reducing tower, a plurality of tuyeres in the lower part of said tower walls for introducing gases into said tower, a pressure melting furnace, means for feeding hot reduced material from the bottom end of the tower directly into said furnace, a flue for conducting combustion gases from said furnace to the tuyeres in said tower, said furnace having a roof comprising laterally abutting rows of refractory blocks removably suspended on hollow water-cooled beams supported at their ends on the furnace walls, said blocks having inner facings slidably keyed thereon of refractory material having high thermal shock resistance, and said beams being located in a sealed chamber containing gas under pressure.

17. Apparatus for smelting hydrogen-reducible ores to produce molten material of high purity, including walls forming a vertical roasting and reducing tower, a plurality of tuyeres in the lower part of said tower walls for introducing gases into said tower, a pressure melting furnace, means for feeding hot reduced material from the bottom end of the tower directly into said furnace, a flue for conducting combustion gases from said furnace to the tuyeres in said tower, said furnace having downwardly inclined burners extending through its walls for discharging combustion gases into the furnace, and each burner comprising an outer refractory tube carrying fuel gas and an inner axial tube carrying oxygen for mixing with the fuel gas before it issues from said outer tube.

18. Apparatus for smelting hydrogen-reducible ores to produce molten metal of high purity, including walls forming a vertical roasting and reducing tower, a plurality of tuyeres in the lower part of said tower walls for introducing gases into said tower, a pressure melting furnace, means for feeding hot reduced material from the bottom end of the tower directly into said furnace, a flue for conducting combustion gases from said furnace to the tuyeres in said tower, said furnace having downwardly inclined burners on opposite sides for discharging combustion gases into the furnace, each burner comprising an outer refractory tube and an inner axial tube perforated along its inner end portion, and means exterior of the furnace for introducing fuel gas into said outer tube and oxygen into the inner tube.

19. Apparatus for smelting hydrogen-reducible ores to produce molten metal of high purity, including a pressure melting furnace, walls forming a vertical roasting and reducing tower communicating at its bottom end with said furnace, means for feeding hot material from the bottom end of said tower directly into said furnace, a flue for conducting combustion gases from said furnace to said tower, means for discharging cooling and enriching gases into said flue, an annular plenum chamber formed in the tower walls surrounding the lower end of tuyeres in the tower walls providing communicating between said plenum chamber and the interior of said tower.

20. Apparatus for smelting hydrogen-reducible ores to produce molten metal of high purity, including a pressure melting furnace, walls forming a vertical roasting and reducing tower communicating at its bottom end with said furnace, means for feeding hot material from the bottom end of said tower directly into said furnace, a flue for conducting combustion gases from said furnace to said tower, means for discharging cooling and enriching gases into said flue, an annular plenum chamber formed in the tower walls surrounding the lower end of the tower, a series of vertically spaced annular rows of tuyeres in the tower walls providing communication between said plenum chamber and the interior of said tower, and a series of vertically spaced annular rows of openings in the upper part of said tower walls connected to an exterior manifold for taking off partially-spent gases.

21. Apparatus for smelting hydrogen-reducible ores to produce molten metal of high purity, including a pressure melting furnace, walls forming a vertical roasting and reducing tower communicating at its bottom end with said furnace, means for feeding hot material from the bottom end of said tower directly into said furnace, a flue for conducting combustion gases from said furnace to said tower, means for discharging cooling and enriching gases into said flue, an annular plenum chamber formed in the tower walls surrounding the lower end of the tower, a series of vertically spaced annular rows of tuyeres in the tower walls providing communication between said plenum chamber and the interior of said tower, a series of vertically spaced annular rows of openings in the upper part of said tower walls connected to an exterior manifold for taking off partially-spent gases and a series of vertically spaced annular rows of tuyeres above said partially-spent gas openings for introducing air into the tower for burning part of the partially-spent gases to create a roasting zone.

22. Apparatus for smelting hydrogen-reducible ores to produce molten metal of high purity, including walls forming a vertical roasting and reducing tower, a plurality of tuyeres in the lower part of said tower walls for introducing gases into said tower, a pressure melting furnace, means for feeding hot reduced material from the bottom end of the tower directly into said furnace, a flue for conducting combustion gases from said furnace to the tuyeres in said tower, means for introducing cooling and enriching gases into said flue, said furnace having downwardly inclined openings in its walls containing refractory bubbler tubes extending into the melt, said bubbler tubes having refractory cores provided with longitudinal passageways extending therethrough for introducing gases into the melt.

References Cited in the file of this patent

UNITED STATES PATENTS

| Number | Name | Date |
|---|---|---|
| 791,928 | Moore et al. | June 6, 1905 |
| 1,934,082 | Moll et al. | Nov. 7, 1933 |
| 2,107,980 | Elian | Feb. 8, 1938 |
| 2,577,730 | Benedict et al. | Dec. 11, 1951 |
| 2,580,614 | Slottman | Jan. 1, 1952 |